United States Patent
Guha

[19]

[11] Patent Number: 5,808,609
[45] Date of Patent: Sep. 15, 1998

[54] METHOD, APPARATUS AND COMPUTER PROGRAM PRODUCTS TO SIMULATE THE DISPLAY OF OBJECTS IN THREE DIMENSIONS

[75] Inventor: Ramanathan V. Guha, Los Altos, Calif.

[73] Assignee: Apple Computer, Inc., Cupertino, Calif.

[21] Appl. No.: 744,611

[22] Filed: Nov. 6, 1996

[51] Int. Cl.$^6$ ........................................ G06F 15/00
[52] U.S. Cl. ........................................ 345/339
[58] Field of Search ........................ 345/419, 435, 345/439, 339, 340, 348

[56] References Cited

U.S. PATENT DOCUMENTS 5,680,562  10/1997  Conrad et al. ........................ 395/342
5,682,486  10/1997  Grossman et al. ..................... 395/339

*Primary Examiner*—Phu K. Nguyen
*Attorney, Agent, or Firm*—Fenwick & West LLP

[57] ABSTRACT

Methods, apparatus and computer program products adjust display attributes of hierarchically arranged objects to simulate the user navigating through the objects in three dimensions. Objects in the same level of the hierarchy are displayed in a size different from objects on other levels of the hierarchy to simulate the objects on each level being on a different plane, one behind another. Each object's child objects are displayed clustered around the projection of the object into the plane of the child objects to graphically display the parent-child relationship. As the user navigates into the objects, the objects grow in size to simulate the user moving closer to them. The cluster of child objects spreads out from the projection of the parent at a different rate than the objects grow in size to allow for easier navigation among the objects and to allow additional objects that are descended from the child objects to be displayed clustered around their respective parent objects.

29 Claims, 11 Drawing Sheets

METHOD, APPARATUS AND COMPUTER PROGRAM PRODUCTS TO SIMULATE THE DISPLAY OF OBJECTS IN THREE DIMENSIONS

FIELD OF INVENTION

This invention relates to computer user interfaces, and more specifically to user interfaces which display information using windows.

BACKGROUND OF THE INVENTION

Many conventional computer software applications display information to a user on a display screen such as a conventional computer display. When a graphical user interface is used to display information, an element of the information may be displayed as an object on the screen. Objects are used to display information such as application program data, files, or other information, and may be displayed as a box or other simple shape, an icon such as a file folder, or a complete set of images displayed in a sequence to simulate a motion picture. Referring now to FIG. 1A, five objects 100, 102, 104, 106, 108 are shown.

Many conventional computer software applications utilize a user interface known as a window. The window is used as a portal to the information displayed by the computer software application, and at any time may allow for the display of a subset of the objects 100, 102, 104, 106, 108 which represent the information the software application is capable of displaying. The user is able to navigate among large amounts of information easily, because the user is only required to relate to the portion of the information that is displayed in the window at any time. In FIG. 1A, the objects 100, 102, 104, 106, 108 are enclosed in a window 160 displayed on a display screen 172. The window 160 is a rectangle that has an upper border 162, a left border 164, a right border 166 and a lower or bottom border 168 although other shapes of the window 160 are possible using any number of borders.

In some applications, the data is arranged in a hierarchical fashion, with each object being assigned a level in the hierarchy. In some of these applications, the data, and therefore the objects which represent the data, are related to one another in an inverted tree structure. A nomenclature associated with a family tree may be conveniently used. Thus, an object is related to one or more objects on the level beneath it by being a parent of such lower level objects, with each of the lower level objects having a common parent being siblings to one another. Each of these siblings may be parents of objects on still lower levels, and these objects would be descendants of the parent of their parent known as a grandparent, the parent of their grandparent, and so forth. A parent of an object is an ancestor of the object, as is the parent of the parent, and so forth.

Some graphical user interfaces display data as if the data is suspended in three dimensions, allowing a user to navigate past objects in three dimensions like astronauts navigating a spaceship among stars. A three-dimensional user interface can allow the user to view hierarchically arranged data by displaying objects at each level in a separate plane. Referring momentarily to FIG. 1B, a side view of the planes 122, 124, 126, 128 in a hierarchy as viewed by a user's eye 132 through the window 160 of FIG. 1A is shown. Data at the first level would be displayed as if it was in the first plane 122, data in the second level displayed as if it was in the second plane 124, and so forth. FIG. 1B shows only four planes 122, 124, 126, 128, however the number of planes on which objects are located may be infinite. In addition, each of the planes 122, 124, 126, 128 may itself have an infinite size in all dimensions. Each of the planes 122, 124, 126, 128 may be displayed as clear or tinted, and the objects displayed on the plane opaque. This allows a user 132 to see objects in more than one plane at a time, subject to objects in more distant planes being blocked by objects in planes that are nearer to the user.

Because conventional display screens display objects in two dimensions, the display of objects on different planes 122, 124, 126, 128 must be simulated. This simulation may be accomplished by displaying objects in a smaller size to simulate the objects being located on a plane 122, 124, 126, 128 that is more distant than other objects which are displayed larger. The simulation may also be accomplished by displaying objects in a different color or display intensity to simulate objects being displayed on different planes. Referring now to FIGS. 1A and 1B, object 100 is on the first level in the hierarchy, and objects 102, 104, 106, 108 are all on the second level of the hierarchy. Object 100 is displayed larger than the objects 102, 104, 106, 108 on the second level of the hierarchy to simulate object 100 occupying a position in plane 122 that is nearer to the user 132, and objects 102, 104, 106, 108 occupying positions on plane 124 which is further from the user 132.

The relationship between objects 100, 102, 104, 106, 108 displayed on a three-dimensional user interface may be graphically represented by clustering the child objects 102, 104, 106, 108 around the projection of their parent 100 on the plane directly behind the plane containing the parent. Thus, parent object 100 is on plane 122, while child objects 102, 104, 106, 108 are arranged around an invisible "shadow" of the parent object 100 on plane 124.

In contrast with a conventional two dimensional display of data in a window, where the user may navigate among the data by only moving the window 160 side to side on the x-axis, or up or down on the y-axis, in a three-dimensional user interface, the user may also navigate "in" or "out", i.e. in the positive or negative direction of the z-axis 134. As the user navigates "into" the window 160, i.e. in the positive z-axis direction, the user 132 and the window 160 do not move. Instead, the objects 100, 102, 104, 106, 108 are displayed differently to simulate the movement of the user 132 and the window 134 in one direction of the z-axis 134 or another. The differences simulate the planes 122, 124, 126, 128 on which the objects 100, 102, 104, 106, 108 are displayed moving in the opposite direction the user wishes to go. Thus, the differences in display simulate the objects 100, 102, 104, 106, 108 and the planes 122, 124, 126, 128 representing levels of the hierarchy moving toward the left of FIG. 1B to make the user appear that he is moving in the positive direction of the z-axis 134. Alternatively, planes 122, 124, 126, 128 may be simulated as moving to the right of FIG. 1B to make the user 132 appear that he is moving in the negative direction of the z-axis 134. Two types of changes are made to the window 160 to simulate this movement.

The first type of change concerns the type of objects that are displayed. Similar to a two dimensional window, which displays only a subset of the objects representing information the application program is capable of displaying in order to allow the user to focus on a portion of the information at a time, objects in a limited number of planes are displayed at any one time to avoid cluttering the window 160 in FIG. 1A and help the user focus on a subset of the planes 122, 124, 126. Only planes 122, 124, 126 between the window 160 and a horizon 130 which is a fixed distance 116 from the window 160, known as the horizon distance 116 from the window, are visible to the user. Objects 100, 102, 104, 106, 108 on any plane 122, 124, 126, 128 are only visible when the plane 122, 124, 126, 128 is visible because it is between the window 160 and the horizon 130. As the user interface simulates the planes 122, 124, 126, 128 moving to the left, some planes 122, 124, 126, 128 become visible on the horizon while other plates 122, 124, 126, 128 disappear to the left of the window 160, and as the user interface simulates the planes 122, 124, 126, 128 moving to the right, some planes 122, 124, 126, 128 disappear over the fixed horizon 130 while other planes 122, 124, 126, 128 appear when they pass the window 160. From the user's 132 point of view, as the user 132 navigates past one plane 122 representing one level of the hierarchy, objects 100 in the plane passed 122 disappear, and objects in the nearest non-displayed plane 128 appear. As the user navigates back through plane 122, it will reappear and plane 128 will disappear.

The second type of change concerns the displayed size and positions of the objects 100, 102, 104, 106, 108. To simulate the user approaching the objects 100, 102, 104, 106, 108, the dimensions of the objects 100, 102, 104, 106, 108, as well as the space, such as space 180A, between the objects 100, 102, 104, 106, 108 is made larger. To simulate the reverse, the dimensions of the objects 100, 102, 104, 106, 108, as well as the space between the objects 100, 102, 104, 106, 108 is made smaller.

Referring now to FIG. 1C, the objects 100, 102, 104, 106, 108 of FIG. 1A are shown after a user has navigated closer to them according to a conventional three-dimensional user interface. Compared with the size of the objects 100, 102, 104, 106, 108 of FIG. 1A, the objects 100, 102, 104, 106, 108 of FIG. 1C are twice as large. Compared with the distance 180A between objects 100, 102, 104, 106, 108 of FIG. 1A, the distance 180C between the parent object 100 and each of its children 102, 104, 106, 108 has also increased by a factor of two.

Referring again to FIG. 1B, the user 132 indicates whether to navigate in the positive or negative direction of the z-axis 134 using one or more keyboard or mouse buttons. Each time the appropriate button is pressed by the user 132, 1, the distance 112 between the screen and the first plane displayed 122 changes. Because the spaces 114 between the planes containing each of the displayed objects does not vary, when l 112 is adjusted, the distances of all of the planes 112, 124, 126 to the plane of the screen 172 must be simulated as being changed, either closer to the user 132 or farther from the user 132 by changing the size of each of the objects in all of the displayed planes 122, 124, 126. To allow the user to double the displayed size of an object using nine button presses, objects are enlarged or reduced by a factor of 1.08 per keypress. The x-y axis distance 108A between each object 102, 104, 106, 108 and its parent 100 is also changed by a factor of 1.08 for each keypress. After nine repeated keypresses to navigate in the direction of the positive z-axis 134, the displayed objects double in size, the x-y axis distances between the objects and their parents double in size from 180A to 180C, which simulates the planes 122, 124, 126, 128 advancing one interplane distance 114 nearer to the user 132. Other factors may be used to simulate the change in location of the planes a greater or less distance.

Referring now to FIGS. 1A and 1B, it is desirable to cluster the child objects 102, 104, 106, 108 close to their parent objects 100 to display the parent child relationship graphically and to allow for the display of a maximum number of objects in the window 160. However, as the plane containing the child objects 102, 104, 106, 108 approaches the window 160, it is desirable to ensure adequate space between the objects to allow the user 132 to maneuver among the objects and to allow room to display the descendants of the child objects 102, 104, 106, 108 in an uncluttered way.

SUMMARY OF INVENTION

In accordance with the present invention, methods, apparati and computer program products display objects in a three-dimensional user interface where the spacing between the objects is adjusted differently than the size of the objects as the user navigates in or out of the objects. The allows a user navigating towards objects to see them grow in size at one rate and see them separate from one another at a faster rate, simulating movement towards the objects while providing adequate space between the objects to maneuver among them and to display further descendants of the objects.

DETAILED DESCRIPTION OF A PREFERRED EMBODIMENT

Figure 1A:
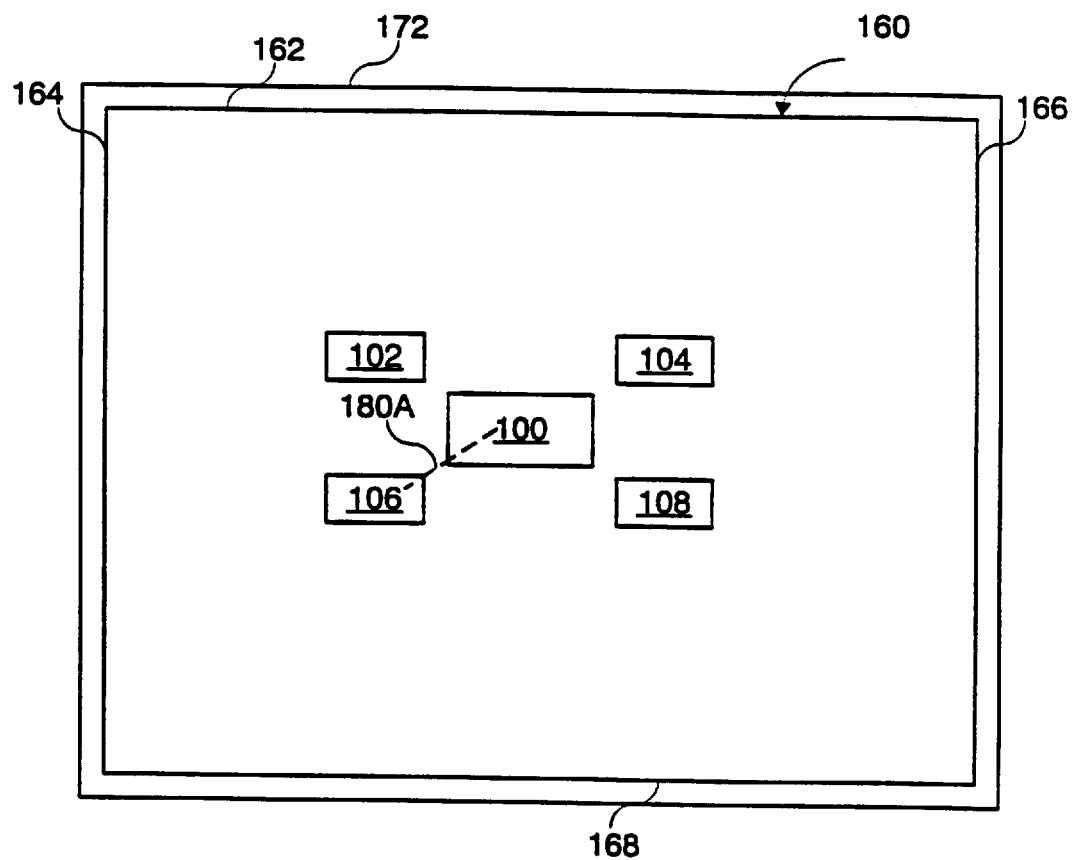
FIG. 1A is an illustration of five of objects representing elements of information arranged in a window by a conventional application program.
Figure 1B:
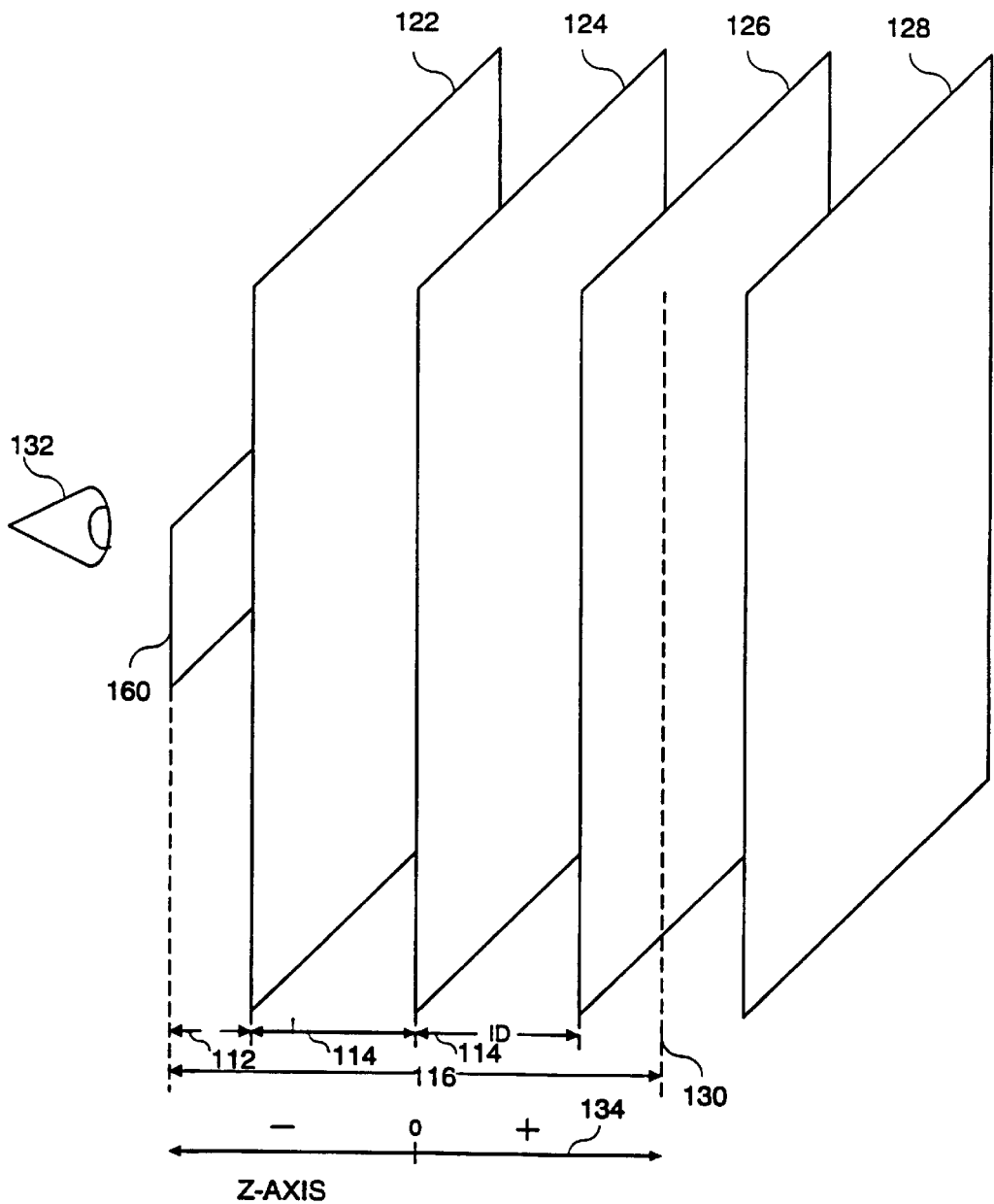
FIG. 1B is a block diagram representing a side view of a window and planes visible in a window on which objects are displayed in a conventional three-dimensional graphical user interface.
Figure 1C:
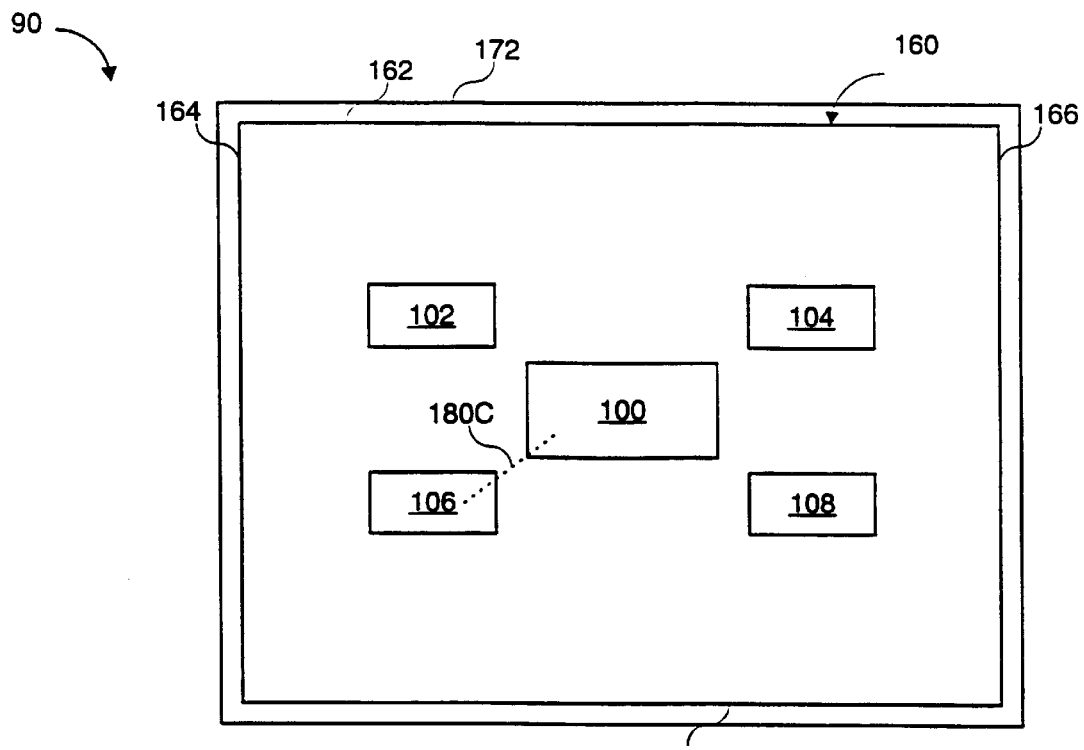
FIG. 1C is an illustration of the display of the objects of FIG. 1A to simulate movement of a user towards the objects in a conventional application program.

Referring now to FIGS. 1A, 1B and 1C, the objects 100, 102, 104, 106, 108 of FIG. 1A are displayed according to one embodiment of the present invention after the user has navigated towards them the same amount as the user navigated toward them in FIG. 1B. The size of each of the objects 100, 102, 104, 106, 108 in FIG. 1C has increased by the same amount as in FIG. 1B, that is, objects 100, 102, 104, 106, 108 in FIG. 1C are twice the size of the same objects 100, 102, 104, 106, 108 displayed in FIG. 1A to simulate the user navigating closer to them. However, the space 280 between each object 102, 104, 106, 108 and the projection of its parent 100 on the plane containing the child objects 102, 104, 106, 108 has increased by more than twice the distance of FIG. 1A. Thus as the user navigates closer to objects 100, 102, 104, 106, 108, they all appear to spread apart from each other faster than they are growing in size. As the user navigates farther away from the objects 100, 102, 104, 106, 108, the reverse occurs, the objects 100, 102, 104, 106, 108 come together faster than they shrink in size.

Figure 3:
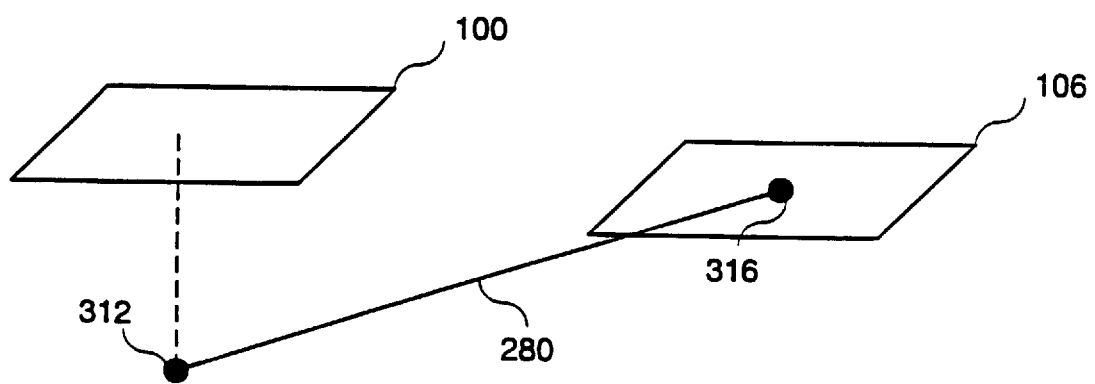
FIG. 3 is a block diagram of a parent object, a child object and the spread between the parent object and child object according to one embodiment of the present invention.

Referring momentarily to FIG. 3, the spread 280 is illustrated in greater detail. The spread 280 is the distance 280 between a projection 312 of the center of object 100 on the plane containing the child object 106 and the center 316 of the child object 106. It is not necessary to calculate the distance 280 using the center to center distance as shown, because any reference points related to the child object 106 and its parent 100 may be used.

Figure 2:
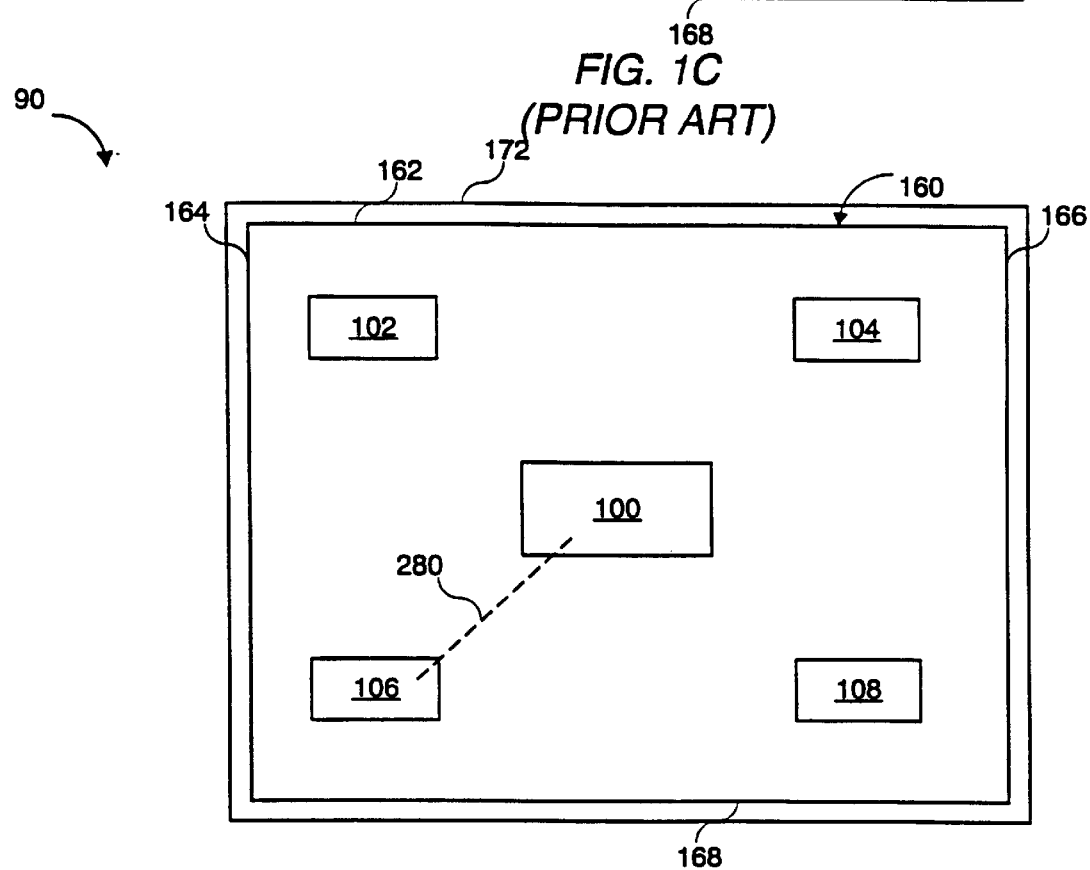
FIG. 2 is an illustration of the display of the objects of FIG. 1A to simulate movement of a user towards the objects in an application program according to one embodiment of the present invention.

Referring now to FIG. 2, in one embodiment of the present invention, the objects grow for each appropriate button press, or the receipt of another signal indicating a desire to navigate forward or backward, by a factor of 1.08 as described above, however other factors may be used to simulate greater or less movement for each button press.

In one embodiment, the x-y distance or spread 280 between an object 106 and its parent 100 is calculated using the prior spread of the object, the increase in size of the object and a scaling factor. The scaling factor may be a constant other than '1' or may be a function. For example, the spread 280 of an object 106 from its parent 100 may be increased from the original distance 180A by twice the increase in size of the object 106 so that the objects 102, 104, 106, 108 spread apart from their parent 100 twice as fast as they grow.

In another embodiment of the present invention, the spread 280 between an object 106 and its parent 100 increases as a function of the increase in size of the objects and the number of sibling objects of the object 106 and all of its presently displayed ancestors 100. The spread between an object 106 displayed in the n-th displayed plane and its parent 100 is calculated as the increase in size of an object 106 divided by the following scaling factor function:

$$K_1/(b_1)^d \times \pi \prod_{m=2}^{n} \sqrt{b_m} = f(n) \quad \text{(Eq. 1)}$$

where:

n=the number of planes displayed between the window and the horizon (Eq. 2)

$b_m$=1+the number of sibling objects of the object or its ancestor in the m-th displayed plane (Eq. 3)

$d=1/K_2$ (Eq. 4)

l=a distance (112 in FIG. 1B) between the window and the first visible plane (Eq. 5)

In one embodiment, $K_1=1$ (Eq. 6)

$K_2=50$ (Eq. 7)

where the display is 480×640 pixels. For other screen sizes, $K_1$ and $K_2$ may be adjusted proportionately.

Figure 4:
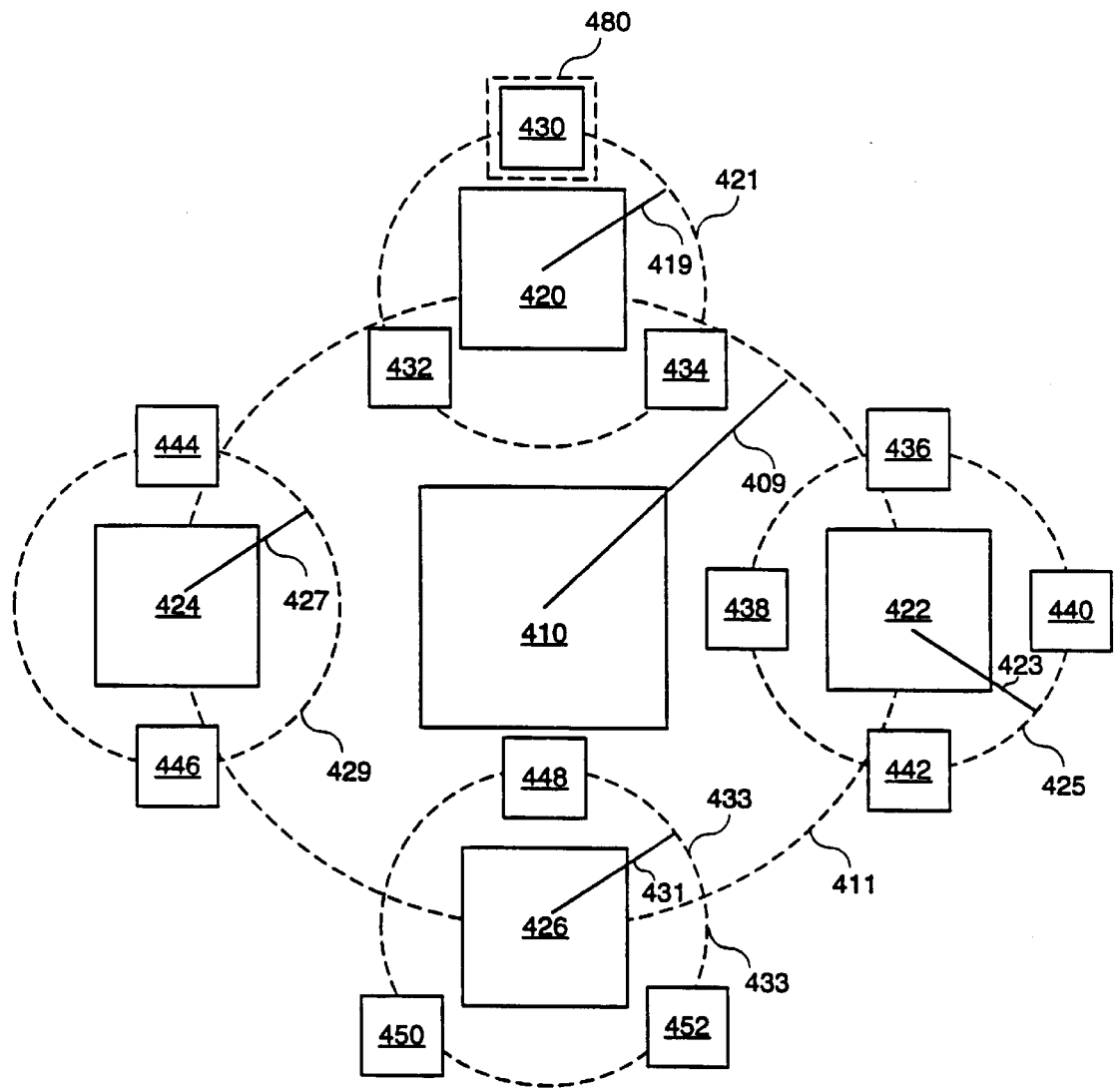
FIG. 4 is a block diagram of objects displayed in three planes according to one embodiment of the present invention.

Referring now to FIG. 4 objects 410, 420, 422, 424, 426, 430, 432, 434, 436, 438, 440, 442, 444, 446, 448 450, 452 are displayed on three planes between a window and a horizon. Objects 420, 422, 424, 426 are arranged in a circle 411 having a radius 409 around their parent object 410. Child objects 430, 432, 434 are arranged in a circle 421 having a spread equal to radius 419 around their parent object 420. Other objects 436, 438, 440, 442, 444, 446, 448, 450, 452 are arranged in circles 425, 429, 433 having radii 423, 427, 431 around parent objects 422, 424, 426, as shown in the Figure. The spread between each of the child objects 420, 422, 424, 426, 430, 432, 434, 436, 438, 440, 442, 444, 446, 448 450, 452 and its parent is equal to the radii of the circle 411, 421, 425, 427, 429 on which the object 420, 422, 424, 426, 430, 432, 434, 436, 438, 440, 442, 444, 446, 448 is displayed.

The scaling factor for each circle 411, 425, 429, 433 at any level must be computed independently of the other circles. Thus, using equations 1–7 above, for circle 425, $b_1$=1 (1+0 sibling objects of object 410), $b_2$=4 (1+three siblings of object 422) and $b_2$=4 (1+3 siblings for each object 436, 438, 440, 442) and the scaling factor for circle 425 will be 1/(1×2×2) or ¼. The scaling factor for circle 429 will be 1/1×2×√2, or 1/2.8 ($b_1$ is the same as above, $b_2$ is 1+3 siblings of object 424, and $b_3$ is 1 plus 1 sibling for each of the objects 444 and 446).

In one embodiment, the scaling factor is divided into the change factor, such as 1.08 or 1/1.08 to obtain a spread factor. The existing spread is multiplied by the spread factor which increases or decreases the spread each time the size of the objects 410, 420, 422, 424, 426, 430, 432, 434, 436, 438, 440, 442, 444, 446, 448 450, 452 are adjusted.

Because the spread is divided by f(n), the radius 423 of circle 425 will grow nearly twice as fast as the radius 427 of circle 429 as the user navigates into the objects 410, 420, 422, 424, 426, 430, 432, 434, 436, 438, 440, 442, 444, 446, 448 450, 452. This allows circles such as circle 425 on which more objects 436, 438, 440, 442 are placed to grow larger than circles such as circle 429 on which fewer objects 444, 446 are placed, increasing the distance between sibling objects for objects 436, 438, 440, 442 which have many siblings and reducing clutter on the screen as the user moves closer to such objects, yet initially occupying the same size as circles 425, 429 when the plane containing objects 430, 432, 434, 436, 438, 440, 442, 444, 446, 448 450, 452 appears over the horizon.

Figure 5A:
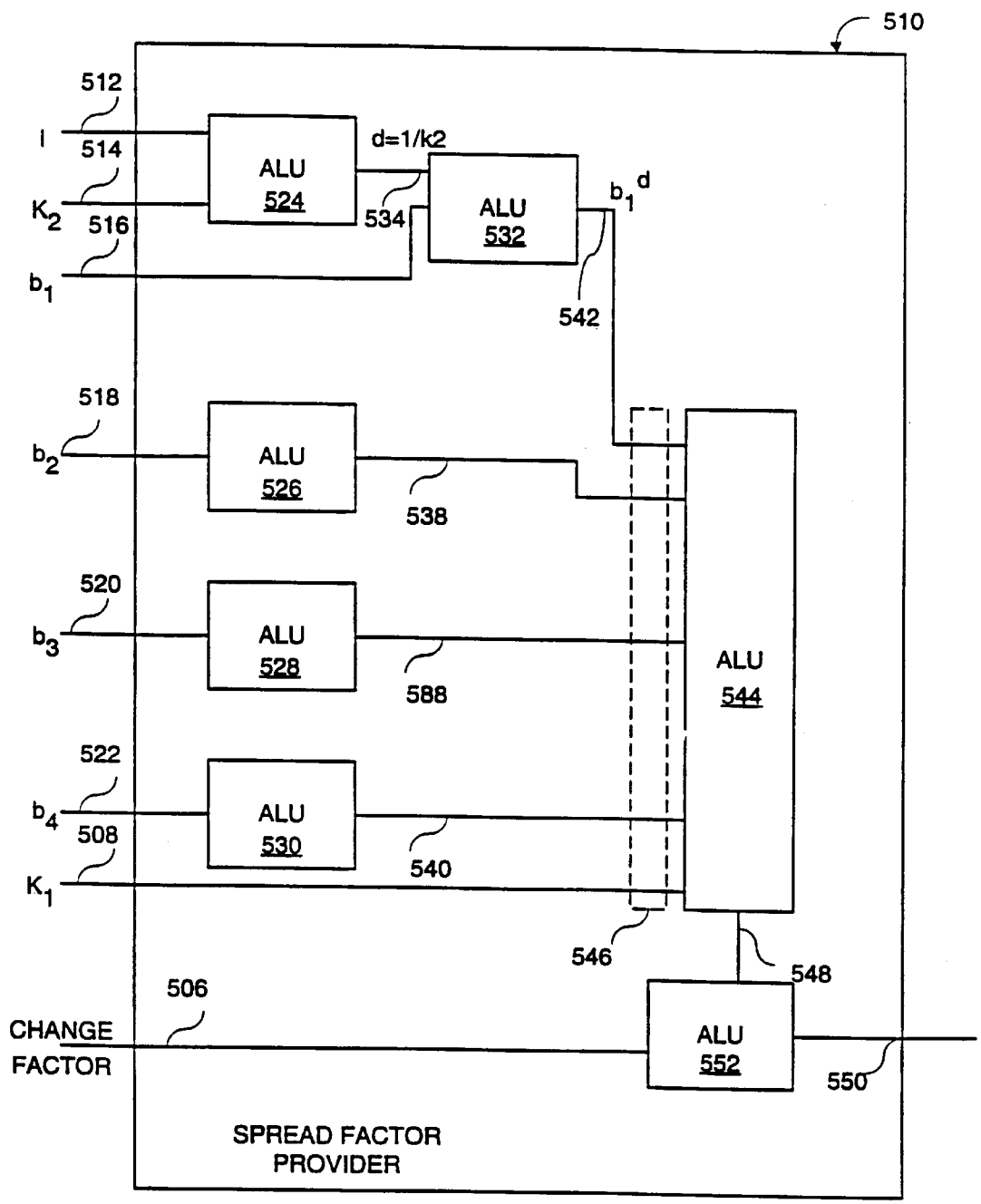
FIG. 5A is a block schematic diagram of a scaling factor calculator according to one embodiment of the present invention.

An apparatus which provides a number which is multiplied, divided, added or subtracted to the current spread to compute a new spread is a spread factor provider. In one embodiment, the spread factor provided by the spread factor provider is equal to the increase or decrease in size, i.e. the change factor, divided by the scaling factor. The new spread of an object is equal to the former spread multiplied by the spread factor. Referring now to FIG. 5A, one embodiment of a spread factor provider 510 for n=4 according to one embodiment of the present invention is shown. Inputs 1 512, $K_2$ 514, $b_1$ 516, $b_2$ 518, $b_3$ 520, $b_4$ 522 and $K_1$ 508 accept the information as described in Equations 2 through 7. Arithmetic logic unit 524 calculates $1/k_2$, and arithmetic logic unit 532 calculates $b_1^d$. Arithmetic logic units 526, 528, 530 calculate the square root of $b_2$, $b_3$ and $b_4$ respectively. Arithmetic logic unit 544 accepts at its inputs 546 the outputs of arithmetic logic units 532, 526, 528, 530 as well as input $K_1$ to compute 1/f(n) of Equation 1 at its output 548.

Change factor used to calculate the size of each object and having a value such as 1.08 or 1/1.08 is received at input 506 and multiplied with 1/f(n) by arithmetic logic unit 552 to provide change factor/f(n) at the output 550 of the scaling factor provider 510.

Figure 5B:
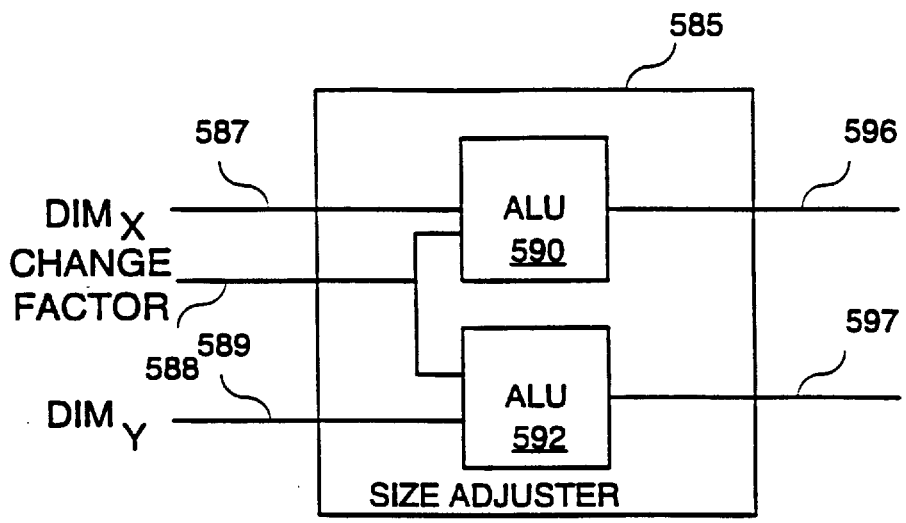
FIG. 5B is a block schematic diagram of a size adjuster according to one embodiment of the present invention.

The updated size of an object may be computed using the change using a size adjuster. Referring now to FIG. 5B, one embodiment of a size adjuster 585 which computes a new size of an object is shown. The change factor is accepted at input 588 and the original size of the object is accepted at inputs 587, 589. In one embodiment, the size of each object is defined by a box having x and y dimensions, corresponding to inputs 587, 589 respectively. The representation of the object inside the box may be of any shape, with the box defined being the smallest box able to accommodate the object. Arithmetic logic units 590, 592 multiply the change factor by the x and y dimensions of the box, respectively, to produce the new x and y dimensions at outputs 596, 597, respectively.

Figure 5C:
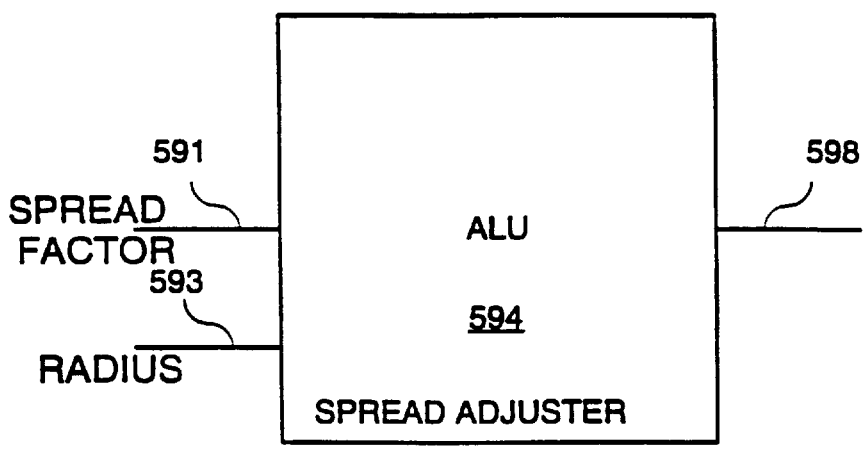
FIG. 5C is a block schematic diagram of a spread adjuster according to one embodiment of the present invention.

The spread between an object and its parent is updated using a spread adjuster. Referring now to FIG. 5C, a spread adjuster 594 according to one embodiment of the present invention is shown. Spread adjuster 594 consists of an arithmetic logic unit to computes the new spread, 280 of FIG. 2A, between the parent and each of its children by multiplying the spread factor from input 591 such as is produced by output 550 of FIG. 5A, and the prior spread between the parent object and its children at input 593 and producing the product at its output 598.

Although the apparati above are useful in calculating the spread of each object from the object's parent, to display an object on a display screen, a position identifier may be necessary. In one embodiment, each object is displayed according to an x and y coordinate corresponding to its position in the plane with 0,0 indicating a reference position, such as the upper left hand corner of the currently used portion of the plane. The x and y coordinates for each object at the highest level of the hierarchy are initialized to spread the objects at the highest level across and around the window, and the remainder of the x and y coordinates are calculated using the spread only for the objects having a level corresponding to one of the planes to be displayed. The x and y coordinates for objects at levels other than the highest level may be stored, or may not be stored, but recalculated when needed.

To obtain the x and y coordinates of an object, a position identifier is used in one embodiment. In one embodiment, each object not in the highest level of the hierarchy has a position identifier corresponding to its position with respect to its parent. In one embodiment, the position identifier identifies an angle, in degrees or radians, of the object with respect to its parent. Referring momentarily to FIG. 4, in one embodiment, the position of an object 432 with respect to its parent 420 may be identified by an angle formed by the line (not shown) between the parent object 420 and a reference position 480, and the line (not shown) between the parent 420 and the object 432. For example, object 432 is 120 degrees counterclockwise from the reference position 480, and would have a position identifier of 120. Object 430 is zero degrees from the reference position and would have a position identifier of 0. In another embodiment, each parent object is stored with the number of child objects it has, and each child is assigned a number, 0 through the number of child objects less 1. The position identifier may be calculated by dividing 360 degrees by the number of children, and multiplying the result by the number of the object to obtain the position identifier in degrees of any object. Thus, because parent 420 has three objects, the position identifier of object. 432 if numbered one, would be 1×360/3 or 120. This technique will evenly space the objects 430, 432, 434 in a circular pattern 421 around its parent 420. The x and y coordinate of an object may be identified using the x and y coordinate of the parent of the object, the sine and cosine of the position identifier of the object, and the distance between the parent and the object.

Figure 5D:
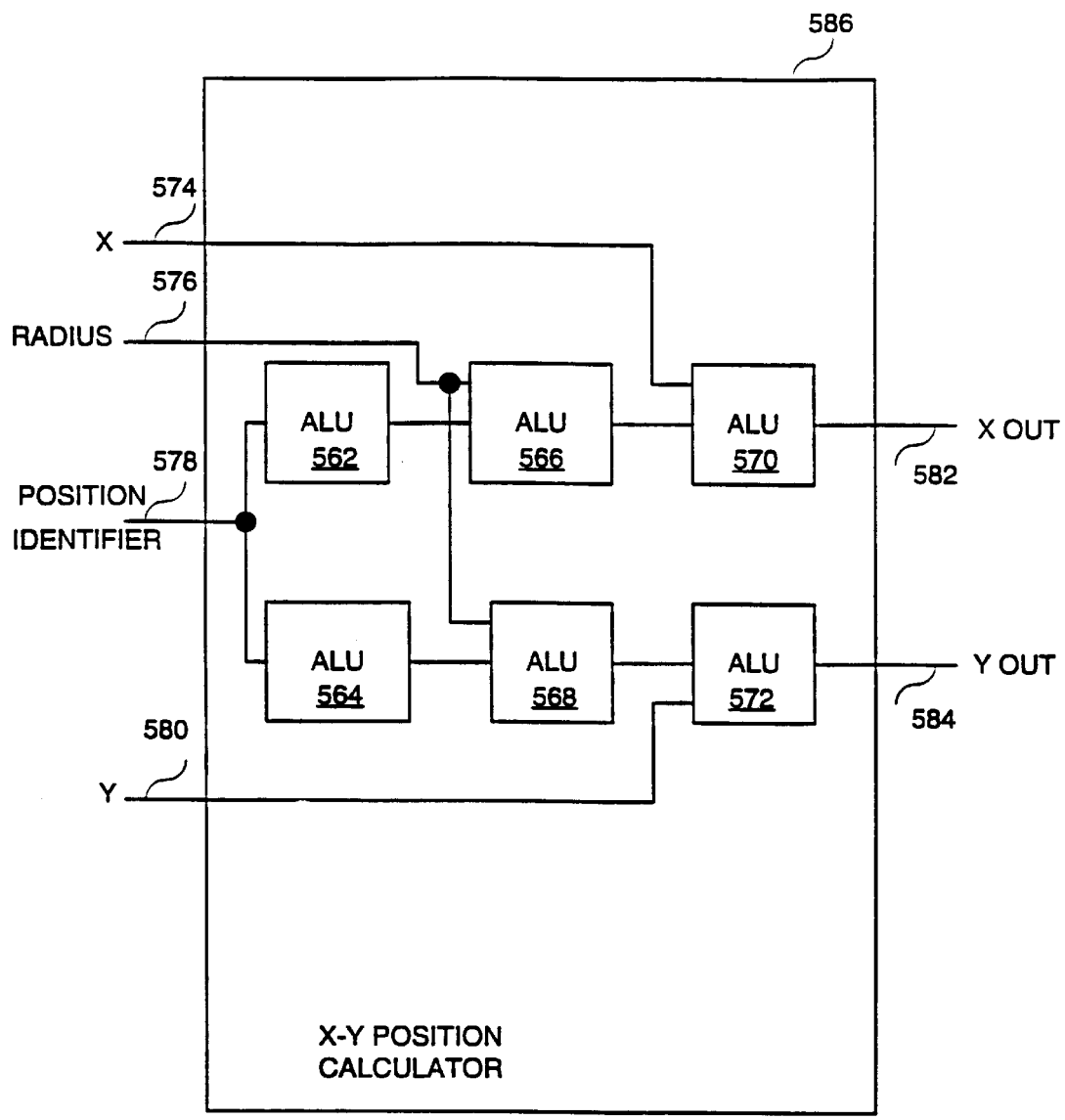
FIG. 5D is a block schematic diagram of an x-y position calculator according to one embodiment of the present invention.

Referring now to FIG. 5D, one embodiment of an x-y position calculator 586 that calculates the x and y coordinates of an object according to one embodiment of the present invention is shown. X and y coordinate inputs 574, 580 receive the x and y coordinates of the parent of the object. In one embodiment, these x and y coordinates define the midpoint of the parent object. The spread between the object from its parent is received at input 576. The position identifier of the object in degrees or radians is received at input 578. Arithmetic logic unit 562 calculates the sine of the position identifier and arithmetic logic unit 564 calculates the cosine of the position identifier. Arithmetic logic units 566, 568 multiply the distance received at input 576 by the sine and cosine from arithmetic logic units 562 and 564 respectively to produce the offset between the object and its parent in the directions of the x and y axis, respectively. Arithmetic logic units 570, 572 add the result from Arithmetic logic units 566, 568 to the x and y inputs 574, 580 to compute the x and y coordinates of the object described by the inputs 574, 576, 578, 580. Such x and y coordinates are presented at outputs 582, 584, respectively.

Figure 6:
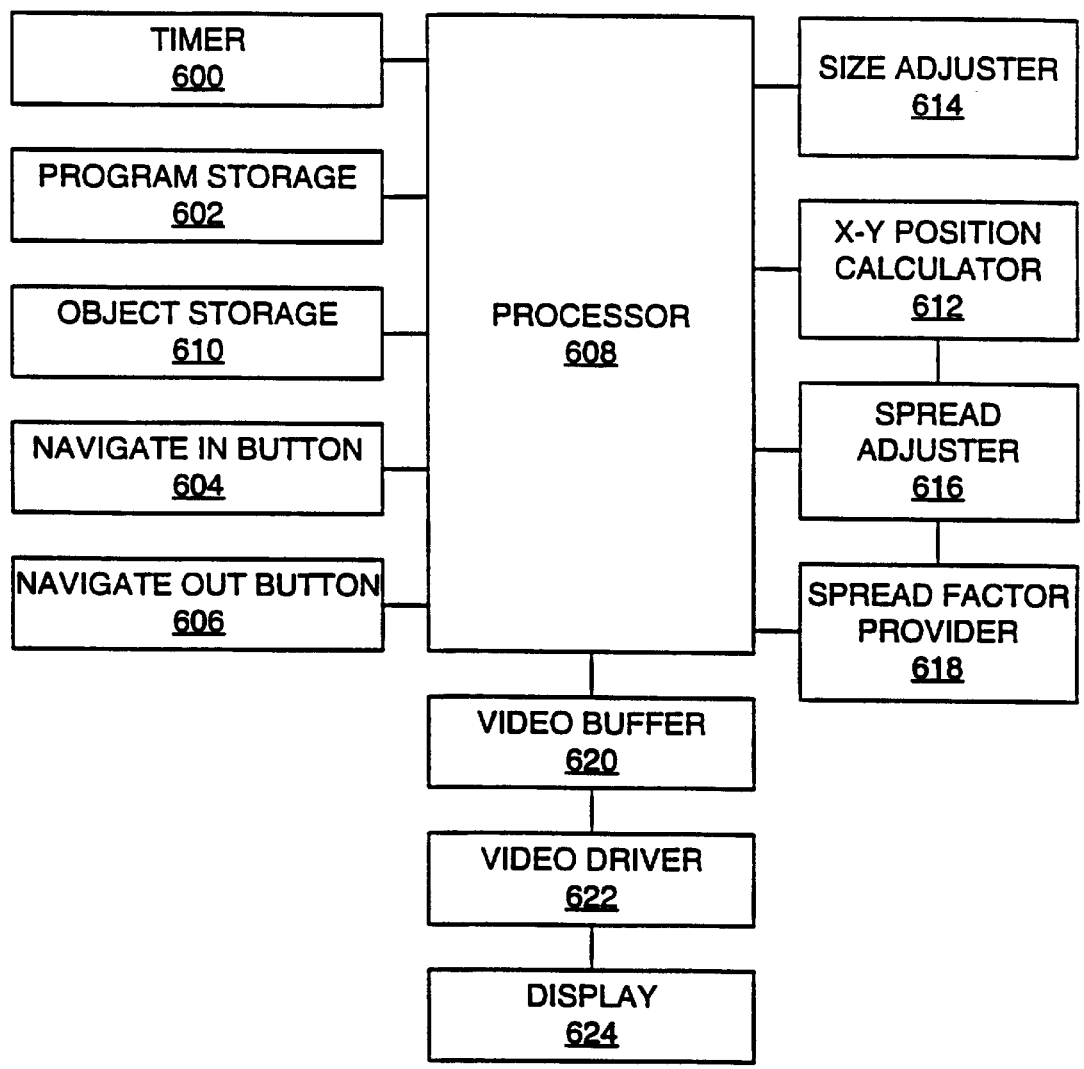
FIG. 6 is a block schematic diagram of an apparatus for displaying objects in a three-dimensional graphical user interface according to one embodiment of the present invention.

Referring now to FIG. 6, an apparatus for displaying objects according to one embodiment of the present invention is shown. Attributes of objects are stored in object store 610 such as a conventional memory or disk. For each object, the attributes stored include the level in the hierarchy of the object, pointers to the attributes of the parent of the object, pointers to each child of the object, the spread between the object and its children, the size of the object in at least two dimensions, colors and shape of the object, position identifiers such as an angle of the object from a reference position and/or number of the object and number of children of the object, and other attributes. The storage of attributes such as the spread between the object and its children can allow for faster calculation and a reduction in storage space over the alternative of storing the spread between an object and its parent, because the former storage method only requires the spread to be stored once with the attributes of the parent, rather than storing duplicate copies for each child object. Because the spread is only stored once, it need only be calculated once.

When navigate in button 604 or navigate out button 606 are pressed, conventional processor 608 under control of stored program such as is described below stored in conventional program storage 602 such as a memory or a disk parses the objects stored in object storage 610 having levels corresponding to the planes currently displayed to adjust their sizes and positions.

The size attribute of each object displayed is adjusted by size adjuster 614 which operates similar to size adjuster 585 of FIG. 5C to adjust the size of the object in both the x and y dimension. In one embodiment, processor 608 sends size adjuster two dimensions of a box containing the icon of the object and provides a change factor of 1.08 if the navigate in button 604 is pressed, and 1/1.08 if the navigate out button 606 is pressed, although other change factors may be provided by processor 608. On one embodiment, when one of the navigate buttons 604, 606 are pressed, processor sets timer 600 to signal after a preset period of 0.2 seconds. If the same button is pressed more than a certain number of times such as twice before the timer 600 signals that the preset period has elapsed, processor 608 adjusts the change factor to increase the amount of the change, for example to 3×1.08 or 1/(3×1.08), so that the operation of the user interface occurs faster if the user holds down or rapidly presses one of the navigate buttons 604, 606. The updated size may be stored by processor 608 in object storage 610.

Processor 608 maintains the distance l for each press of the navigate buttons 604, 606 by subtracting or adding an appropriate amount. l may be maintained as a fraction of the interplane distance, so each single click of the navigate button increases or decreases l by ⅛ of an interplane distance. When l grows larger than 1 or smaller than 0, processor 608 subtracts or adds 1 to l and adjusts a list of presently displayed planes to accommodate the movement of a presently displayed plane beyond the horizon or behind the window.

Processor 608 also sends the change factor and attributes of the object and its ancestor objects to the spread factor provider 618 which calculates the spread factor such as the change factor/f(n) similar to that of spread factor provider 510 of FIG. 5A. Spread factor provider 618 may calculate any function, such as the function of Equation 1 above divided into the change factor provided by processor 608, or any other function, or a constant that is not equal to one. Spread factor provider 618 provides the result of the spread factor provided to spread adjuster 616 either directly or via processor 608. Spread adjuster 616 calculates the adjusted the spread between each parent object and its child objects similar to spread adjuster 594 of FIG. 5C. The updated spread is provided either directly from spread adjuster 616 or via processor 608 to x-y position adjuster 612 which calculates the x and y coordinates of the object and returns the coordinates to processor 608. In one embodiment, processor 608 also stores the adjusted spread with the attributes of the parent in object storage 610. Processor 608 renders the icon representing the object using the other attributes stored such as color and shape and writes it to video buffer 620, which displays the image on conventional display 624 via conventional video driver 622.

Referring now to FIGS. 1B and 6, when a plane 122, 124, 126, 128 is no longer between the window 160 and the horizon 1300, it is no longer necessary to adjust the size of the objects on that plane or the spread between the parent objects on the no-longer-displayed plane and any child objects. Thus, processor 608 updates and maintains the size and spread only for objects that are displayed between the window 160 and the horizon 130.

In one embodiment, all planes are initialized at startup behind the horizon 130. As the user uses the navigate in button 604 to navigate in, as planes 122, 124, 126, 128 pass the horizon 130, processor 608 assigns to all objects in the first level, and therefore the first plane 122, an x-y position on the plane by placing one object in a position in the center of the window, and placing each of up to four objects at the midpoint of a line between the first object and the corner of a maximized window 160. Additional objects in the first plane 122 are assigned x,y coordinates outside a maximized window 160. When a plane 122, 124, 126, 128 passes to the left of the horizon 130, each object is also assigned a distance between the object and any of its children, to be adjusted as the plane 122 moves closer to the screen 160. An initial size is assigned to the objects on the first level by processor 608. Object on other levels corresponding to other planes 124, 126, 128 are assigned a size and spread the same as the initial size of the objects on the first level by the processor 608 when each plane 124, 126, 128 passes the horizon 130.

In another embodiment, processor 608 initializes the display as described above, but then adjusts the planes 122, 124, 126, 128 forward so that the first plane 122 is a distance 1 122 from the window 160 approximately one half of the interplane distance 114. The number of planes equal to the horizon distance 116 divided by the interplane distance 114 is thus displayed for the user 132 at startup.

Figure 7:
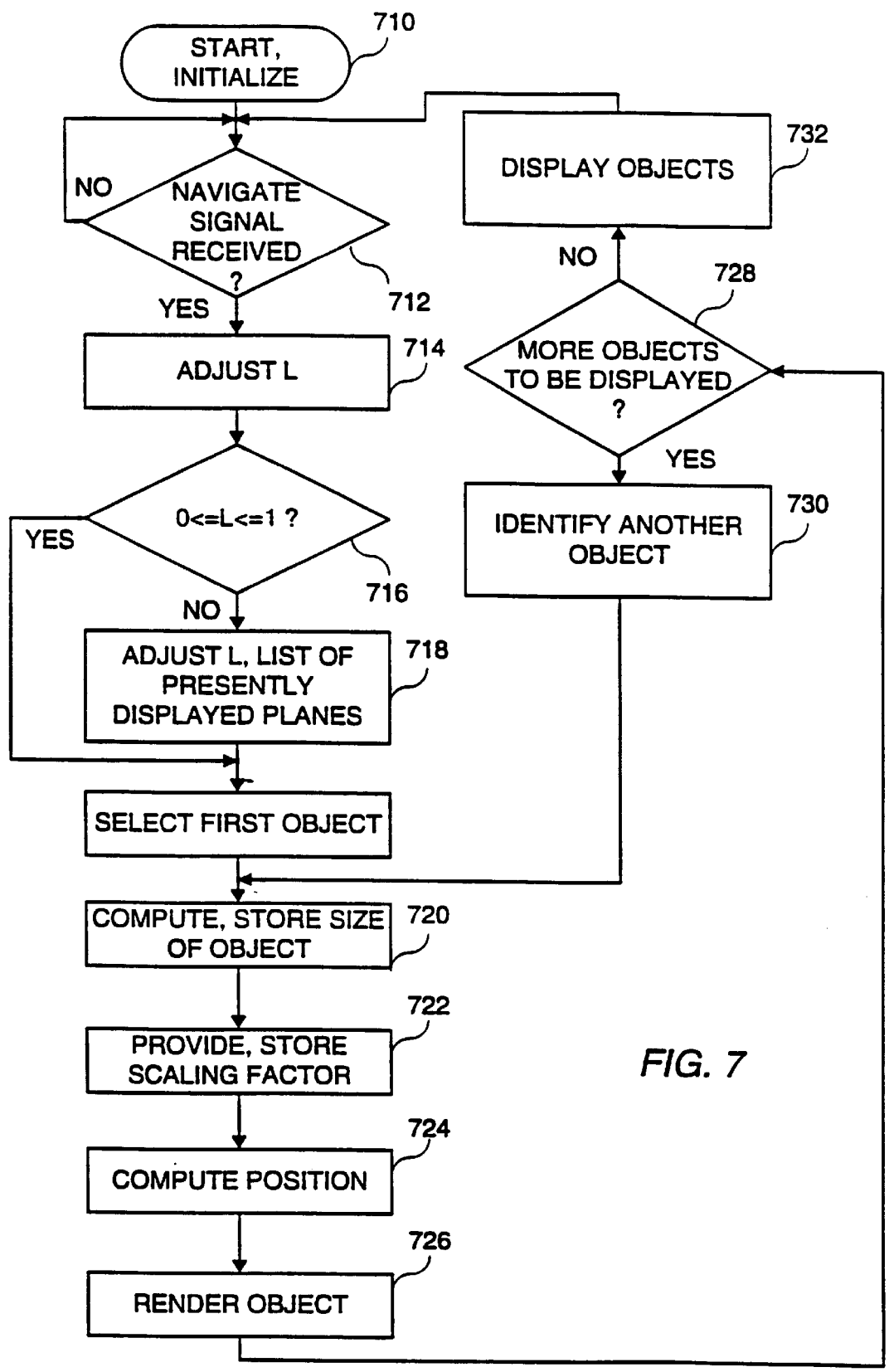
FIG. 7 is a flowchart illustrating a method of displaying objects in response to one or more navigate signals according to one embodiment of the present invention.

Referring now to FIG. 7, a method of displaying objects in a three-dimensional user interface is shown. Variables such as l, the presently displayed levels, the size of each object on each level and the spread of each object are initialized as described above. When a navigation signal such as a user pressing a keyboard key, navigation button, or other signal is received, 712 l is adjusted accordingly. In one embodiment, if a navigation signal indicating the user desires to navigate into the screen is received in step 712, l is reduced by ⅛ of the interplane distance, or increased by ⅛ of the interplane distance if a signal is received in step 712 indicating that the user desires to navigate out of the screen 714. l is checked to make sure one of the planes has not moved behind the window or past the horizon 716. In one embodiment, l greater than or equal 0 and less than or equal to 1 signifies this condition, the units of measurement being an interplane distance. If l is greater than one or less than zero, 1 is added or subtracted to l to bring l within this range, a list of presently displayed planes is adjusted to add planes that have entered the space between the window and the horizon, and to remove planes that are not in this space 718. In one embodiment, a two column list of levels in the hierarchy with one column holding the level number and the other column holding a bit signaling whether the objects at the corresponding level are to be displayed or not displayed serves the purpose of the list. An object that has a level corresponding to the levels to be displayed is selected, and the size of the object is computed 720. In one embodiment, the size is computed by multiplying a change factor by the present size of the object. The size of the object may be optionally stored 720

In one embodiment, if the navigate signal received in step 712 indicates the user desires to navigate into the window, the change factor is 1.08, and if the navigate signal received in step 712 indicates the user desires to navigate out of the window. The change factor is 1/1.08, although other change factors may be used as described above. The scaling factor is provided in one embodiment by multiplying the change factor described above with a function, such as that described in Equation 1, as defined by Equations 2 through 7, or a constant other than 1 as described above 722. In one embodiment, the scaling factor is stored and the position of the object is computed, for example from the scaling factor computed for the parent of the object, the prior spread of the parent between the object and the projection of its parent, and a position identifier as described above 724. The object may then be rendered 726, or the rendering may be performed for all objects at the same time, and thus step 726 is not performed until step 732, described below. If other objects have a level in the hierarchy that is in the list of levels to be displayed, steps 720, 722, 724, and optionally, 726 are repeated for each of those objects 728, 730. When no other objects have a level corresponding to the levels to be displayed, the objects are displayed 732. Objects may be displayed as they are rendered and so step 732 may be performed at the same time as step 726.

Figure 8:
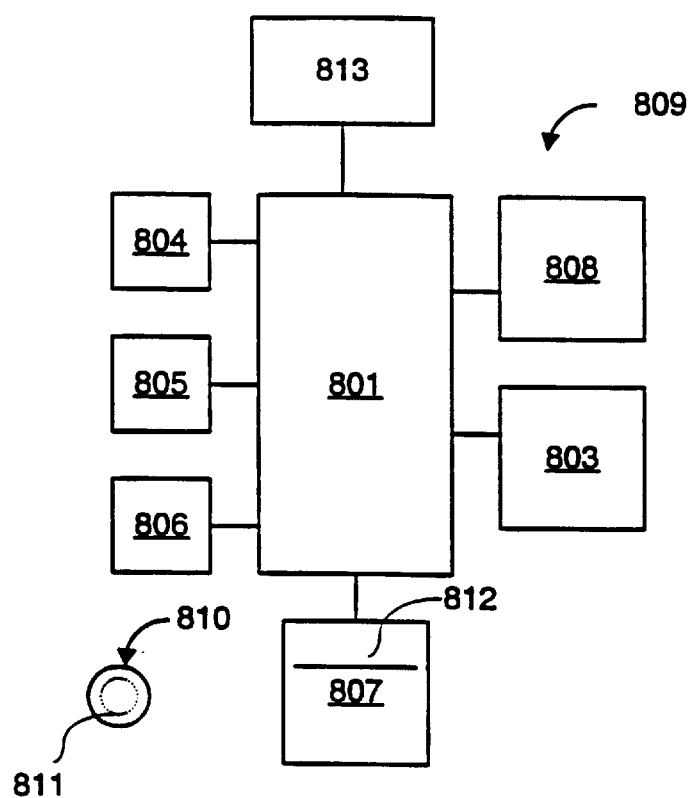
FIG. 8 is a block schematic diagram of a conventional computer system and a computer program product.

The apparatus or methods of the present invention described above may be implemented in software on a conventional computer system in a preferred embodiment. As shown in FIG. 8, a conventional computer system 809 includes a processor 801 coupled to a first storage device 803 such as a memory, and a second storage device 808 such as a disk storage system. A user may interact with the system via a keyboard 804, mouse 805 and a display 806. Computer program product reader 807, such as a memory, hard drive, floppy disk drive or CD-ROM drive can is coupled to processor 801 to allow computer readable program code devices 811 such as encoded bits of a computer program product 810 such as a memory, hard disk, floppy disk, CD-ROM or other storage device to be read and their contents input to processor 801 and stored in memory 803 and/or disk storage 808 for use in controlling the operation of the computer system 809 when computer program product 810 is inserted into slot 812 of computer program product reader 807 or when computer program product 810 is otherwise activated. Communication interface 813 such as a modem may also be coupled to processor 801 to allow for remote retrieval of computer readable program code devices for storage on memory 803 or disk storage 808. An operating system is loaded into memory 803 or disk storage 608 or a combination of memory 803 and disk storage 808 and instructs processor 801 to load and execute computer program products from computer program product 810 or other storage devices 803, 808 comprising applications such as those which display objects as described above. Many conventional applications are distributed on computer program products 810, such as diskettes, storage devices such as ROMs or disk storage systems, each containing computer readable code devices 811 which cause the computer system 809 to operate in a particular manner such as is described herein when a copy of the code devices is loaded into the computer system 809.

In one embodiment, the methods and apparati described herein are implemented in software and copied and distributed on a computer program product to operate on a conventional computer system such as the computer system 809 shown in FIG. 8.

What is claimed is:

1. An apparatus for changing a representation of an image responsive to a navigation signal, the representation comprising a plurality of objects, at least one object having at least one size, and at least one spread from at least one other of the plurality of objects, the apparatus comprising:

a change factor provider for providing a change factor responsive to the navigation signal at a change factor provider output;

a spread factor provider for providing at a spread factor provider output a spread factor different from the change factor; and an image representation changer having a first input coupled to the change factor provider output, a second input coupled to receive the spread factor provider output, and having an output for providing at least one coordinate of at least one object responsive to the change factor and spread factor received.

2. The apparatus of claim 1 wherein the change factor provider comprises:

a first input coupled to receive a signal indicating a navigation direction; and a change factor calculator for calculating the change factor provided at the change factor provider output responsive to the signal received at the first input.

3. The apparatus of claim 1 wherein the spread factor provider comprises:

a change factor input coupled to the change factor provider output; and a scaling factor input; and wherein the spread factor provided at the output is responsive to the change factor input and the scaling factor input.

4. The apparatus of claim 3 wherein the spread factor provided at the spread factor provider output is responsive to the product of the change factor input and the scaling factor input.

5. The apparatus of claim 4 wherein the spread factor provided at the spread factor provider output is equal to the product of the change factor input and the scaling factor input.

6. The apparatus of claim 4 wherein the plurality of objects comprises at least one child object having at least one ancestor, the at least one ancestor having a number of child objects, the apparatus additionally comprising a scaling factor provider comprising:

at least one input coupled to receive at least one number of child objects of at least one of the ancestors of the at least one child object; and an output responsive to at least one of the inputs.

7. The apparatus of claim 6 wherein the scaling factor provider output is responsive to the square root of at least one of the inputs.

8. The apparatus of claim 7 wherein the scaling factor provider output is responsive to the product of the square roots of a plurality of the at least one inputs.

9. A method of adjusting a size and spread of each of a plurality of objects for display comprising:

providing a change factor;

providing a spread factor different from the change factor;

adjusting the size of a set of at least one of the objects using the change factor provided; and adjusting the spread of at least one of the set of objects using the spread factor provided.

10. The method of claim 9 wherein providing the scaling factor comprises the steps of:

providing a number not equal to one; and multiplying the change factor by the number provided.

11. The method of claim 10 wherein:

at least one of the plurality of objects has at least one sibling; and providing the number comprises calculating a scaling function result comprising identifying a number of siblings of at least one object.

12. The method of claim 11 wherein calculating the scaling function result additionally comprises identifying a square root of the number of siblings of the at least one object.

13. The method claim 12 wherein at least one of the at least one objects has an ancestor, at least one ancestor having at least one sibling, and calculating the scaling function result additionally comprises identifying at least one number of siblings of at least one ancestor of the at least one object.

14. The method of claim 11 wherein calculating the scaling function result comprises identifying a square root of the at least one number of siblings of the at least one ancestor of the object.

15. The method of claim 9 wherein computing the scaling factor comprises adding to the change factor a number not equal to zero.

16. A computer program product comprising a computer usable medium having computer readable code embodied therein for adjusting a size and spread of each of a plurality of objects for display comprising:

computer readable program code devices configured to cause a computer to provide a change factor;

computer readable program code devices configured to cause a computer to provide a spread factor different from the change factor;

computer readable program code devices configured to cause a computer to adjust the size of a set of at least one of the objects using the change factor provided; and computer readable program code devices configured to cause a computer to adjust the spread of at least one of the set of objects using the spread factor provided.

17. The computer program product of claim 16 wherein the computer readable program code devices configured to cause a computer to provide the scaling factor comprise:

computer readable program code devices configured to cause a computer to provide a number not equal to one; and computer readable program code devices configured to cause a computer to multiply the change factor by the number provided.

18. The computer program product of claim 17 wherein:

at least one of the plurality of objects has at least one sibling; and the computer readable program code devices configured to cause a computer to provide the number comprises computer readable program code devices configured to cause a computer to calculate a scaling function result comprising computer readable program code devices configured to cause a computer to identify a number of siblings of at least one object.

19. The computer program product of claim 18 wherein the computer readable program code devices configured to cause a computer to calculate the scaling function result additionally comprises computer readable program code devices configured to cause a computer to identify a square root of the number of siblings of the at least one object.

20. The computer program product of claim 19 wherein at least one of the at least one objects has an ancestor, at least one ancestor having at least one sibling, and the computer readable program code devices configured to cause a computer to calculate the scaling function result additionally comprises computer readable program code devices configured to cause a computer to identify at least one number of siblings of at least one ancestor of the at least one object.

21. The computer program product of claim 18 wherein the computer readable program code devices configured to cause a computer to calculate the scaling function result comprises computer readable program code devices configured to cause a computer to identify a square root of the at least one number of siblings of the at least one ancestor of the object.

22. The computer program product of claim 16 wherein the computer readable program code devices configured to cause a computer to compute the scaling factor comprise computer readable program code devices configured to cause a computer to add to the change factor a number not equal to zero.

23. An apparatus for adjusting a size and spread of each of a plurality of objects for display comprising:

means for providing a change factor;

means for providing a spread factor different from the change factor;

means for adjusting the size of a set of at least one of the objects using the change factor provided; and means for adjusting the spread of at least one of the set of objects using the spread factor provided.

24. The apparatus of claim 23 wherein the means for providing the scaling factor comprises:

means for providing a number not equal to one; and means for multiplying the change factor by the number provided.

25. The apparatus of claim 24 wherein:

at least one of the plurality of objects has at least one sibling; and the means for providing the number comprises means for calculating a scaling function result comprising means for identifying a number of siblings of at least one object.

26. The apparatus of claim 25 wherein the means for calculating the scaling function result additionally comprises means for identifying a square root of the number of siblings of the at least one object.

27. The apparatus of claim 26 wherein at least one of the at least one objects has an ancestor, at least one ancestor having at least one sibling, and the means for calculating the scaling function result additionally comprises means for identifying at least one number of siblings of at least one ancestor of the at least one object.

28. The apparatus of claim 25 wherein the means for calculating the scaling function result comprises means for identifying a square root of the at least one number of siblings of the at least one ancestor of the object.

29. The apparatus of claim 23 wherein computing the scaling factor comprises adding to the change factor a number not equal to zero.

* * * * *